United States Patent
Crescenzo et al.

(10) Patent No.: US 10,368,571 B2
(45) Date of Patent: Aug. 6, 2019

(54) MACHINE FOR RECOGNIZING AND ORIENTING FRUITS AND METHOD

(71) Applicant: FOOD MACHINERY CRESCENZO S.R.L., Montecorvino Pugliano (sa) (IT)

(72) Inventors: Biagio Crescenzo, Montecorvino Pugliano (IT); Pasquale Fedele, Siena (IT)

(73) Assignee: FOOD MACHINERY CRESCENZO S.R.L., Montecorvino Pugliano (SA) (IT)

( * ) Notice: Subject to any disclaimer, the term of this patent is extended or adjusted under 35 U.S.C. 154(b) by 326 days.

(21) Appl. No.: 15/125,466

(22) PCT Filed: Mar. 6, 2015

(86) PCT No.: PCT/IB2015/051641
§ 371 (c)(1),
(2) Date: Sep. 12, 2016

(87) PCT Pub. No.: WO2015/136420
PCT Pub. Date: Sep. 17, 2015

(65) Prior Publication Data
US 2017/0079318 A1     Mar. 23, 2017

(30) Foreign Application Priority Data
Mar. 10, 2014   (IT) .............................. RM2014A0115

(51) Int. Cl.
A23N 3/04     (2006.01)
A23N 4/04     (2006.01)
(52) U.S. Cl.
CPC *A23N 3/04* (2013.01); *A23N 4/04* (2013.01)

(58) Field of Classification Search
CPC .................................... A23N 3/04; A23N 4/04
(Continued)

(56) References Cited

U.S. PATENT DOCUMENTS 3,878,309 A   4/1975   Anderson et al.
4,121,511 A   10/1978  Casanova Valero
(Continued)

FOREIGN PATENT DOCUMENTS

EP   2 167 408 B1    11/2012
WO   2008/148177 A1  12/2008
(Continued)

OTHER PUBLICATIONS

International Search Report, dated May 29, 2015, from corresponding PCT Application.

*Primary Examiner* — Thien S Tran
(74) *Attorney, Agent, or Firm* — Young & Thompson

(57) ABSTRACT

A machine and method for recognizing and orienting fruits, especially peaches, for their automatic pitting, the machine has a fruit flight conveyor (1) up to a cutting station (6) in which a vertical cutting plane is provided, the fruit flights (4) being shaped with a number of recesses (7) in which fruits (P) are positioned with fruit suture plane thereof, containing a suture line (ls), being arranged vertically. A fruit recognizing station (8) is suitable to detect the position of the vertical suture plane, and to calculate an angle (α) between the suture line (ls) and the cutting line (lt), or to communicate information of non-detection. An orientation station (16) is adapted to receive information on the dihedral angle, and to control a respective gripping unit (17) to grip and rotate a fruit to a final position, or to remove from the fruit lane.

8 Claims, 4 Drawing Sheets

(58) Field of Classification Search
USPC .......... 99/491, 636; 198/382, 384; 426/231, 426/484, 485
See application file for complete search history.

(56) References Cited

U.S. PATENT DOCUMENTS

| | | | |
|---|---|---|---|
| 4,147,930 A | | 4/1979 | Browne et al. |
| 4,324,335 A | * | 4/1982 | Conway ................ B07C 5/3422 209/586 |
| 4,872,564 A | * | 10/1989 | van der Schoot ..... A01K 43/00 209/511 |
| 5,078,258 A | * | 1/1992 | van der Schoot ....... A23N 3/00 198/384 |
| 5,626,238 A | * | 5/1997 | Blanc ....................... B07C 5/18 198/370.04 |
| 6,079,542 A | * | 6/2000 | Blood .................... B07C 5/342 198/370.05 |
| 6,691,854 B1 | | 2/2004 | De Greef |
| 7,320,280 B2 | * | 1/2008 | Politino .................. A23N 4/04 99/494 |
| 2002/0008055 A1 | * | 1/2002 | Campbell ............. B07C 5/3422 209/577 |
| 2002/0011567 A1 | * | 1/2002 | Ozanich .................... G01J 3/02 250/326 |
| 2011/0252760 A1 | * | 10/2011 | Bravo Trinidad ..... A01D 46/30 56/10.2 A |
| 2013/0064950 A1 | * | 3/2013 | Randazzo .............. A23N 15/02 426/484 |
| 2014/0272055 A1 | * | 9/2014 | Tao ........................ A23N 15/02 426/484 |

FOREIGN PATENT DOCUMENTS

| | | |
|---|---|---|
| WO | 2012/093933 A1 | 7/2012 |
| WO | 2013/008262 A1 | 1/2013 |

\* cited by examiner

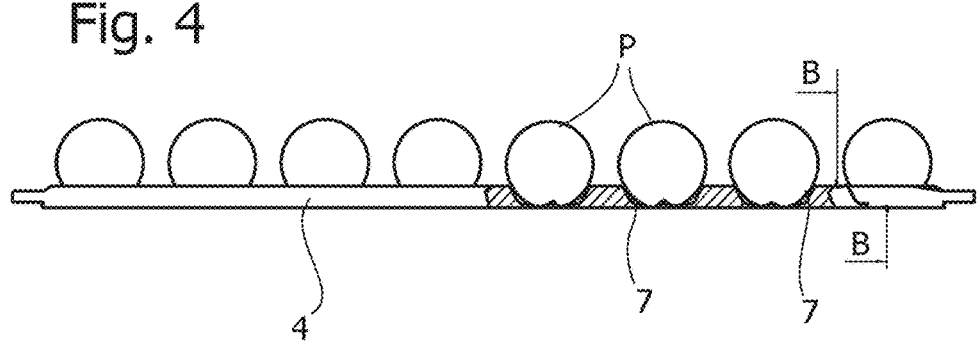
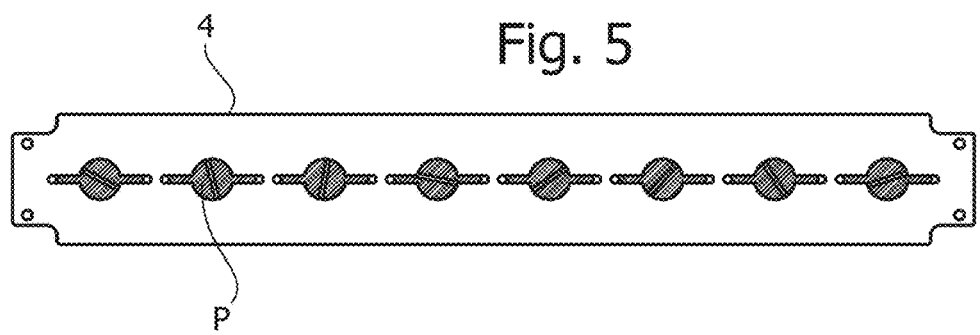
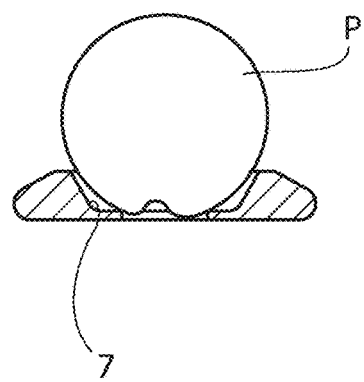
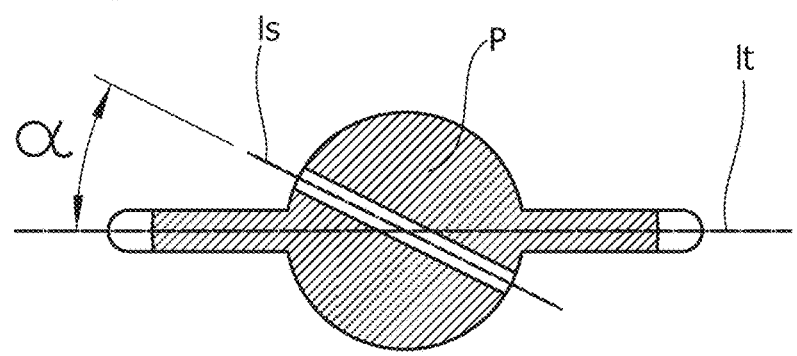

MACHINE FOR RECOGNIZING AND ORIENTING FRUITS AND METHOD

TECHNICAL FIELD

The present invention relates to a machine for recognizing and orienting fruits, especially peaches, for their automatic pitting. It also refers to a method of recognizing and orienting fruits.

BACKGROUND ART

The international patent application No. PCT/IT2012/000209 of the same applicant discloses a multiple-lane fruit positioning apparatus, especially suitable for peaches, comprising a frame and a fruit flight conveyor advancing in the longitudinal direction of said frame, the fruit holding flights being shaped with a number of recesses spaced apart transversely, each recess being provided at the bottom with an opening through which a part of the fruit protrudes. Placed under the fruit holding flights is a device for the orientation of the fruits including a multiplicity of transverse shafts, spaced apart longitudinally, each of them bearing a number of orienting elements spaced apart transversely as said number of recesses. Each orienting element, which is rotatable integrally with each transverse shaft bearing it, finds itself in said opening of recess in contact with the fruit contained therein and moves the fruit in order to position orthogonally to the longitudinal direction the plane containing the suture line of each fruit and its stalk cavity facing downwards.

A drawback linked to an automatic operation of orientation such as that obtained in the apparatus of the above cited patent application, is that the automatic operation of orientation does not ensure that the suture plane of each fruit is positioned parallel to the vertical cutting plane that is orthogonal to the fruit advancing lane. This is due to the fact that the stalk cavity in the fruits is not always so evident that it is combined perfectly with the orienting element. This is, ultimately, a blind positioning of the fruits. It follows that not all the fruits reach, at the cutting station, the above mentioned positioning with a result that the cut is not perfect.

The present invention is based on the detection of the suture line of each fruit so as to achieve its individual orientation.

U.S. Pat. No. 6,691,854 describes a device for orienting fruits. The device has a holder conveyor with holders for the fruits, lifts synchronously co-displaceable with the holders and rotatable relative thereto for lifting the fruits out of the holders and rotating the fruits into, a detector, such as a camera, for detecting the position of each fruit and a control device for the lifts which is connected to the detector and which activates the lifts for a relevant object as long as is required to rotate each single fruit.

EP 2167408 provides a system for the automatic determination of the position and orientation of a fruit placed on rollers, said fruit comprising at least one rotation axis. This European patent starts from the fact that a fruit has a steady and predictable movement on the rollers as a result of a rotation of one or both of the rollers. For example, an apple will rotate around its axis crown-stem or about an axis perpendicular to this. The knowledge of the predictable rotation movements of said fruit allows for the automatic determination of the orientation and position of the fruit within a short time interval using a vision system suitable for the acquisition and analysis of images of the rotating fruit. This information on orientation and position of the fruit can subsequently be used for manipulating the fruit, for instance by a robot suitable for packaging fruit in a desired position and orientation.

Both the above mentioned US patent and European patent aim to an ordered packing of fruits, especially apples, and use, associated with a vision system, a hourglass- or diabolo-shaped roller conveyor that allows an automatic orientation on a statistical basis of each fruit.

It should be evident that these inventions serve mainly to place a fruit in such a way that its central axis is vertical, but they would not be useful to orient a fruit, whose axis is already vertical, so that the cross-section plane containing the suture line is positioned parallel to the cutting plane of the fruit.

Further the inventions described in the cited patents would not give any indication on the precise definition of a line such as the suture line of a peach.

DISCLOSURE OF THE INVENTION

An object of the present invention is to assess whether the suture line of a fruit is evident insomuch as the fruit can be submitted or not to a precise cut along the suture line itself. If it is so, a subsequent object is to calculate the dihedral angle at which the fruit has to be rotated in order to dispose its suture plane parallel to the cutting plane, to grip mechanically the fruit from its recess in the fruit holding flight and to rotate it by this dihedral angle and then put it back on the same recess. If it is not so, a subsequent object is to raise the fruit from recess in the fruit holding flight and separate it from the lane of advancement.

The invention provides a machine suitable for recognizing and orienting fruits, especially peaches, for their automatic pitting, comprising a fruit flight conveyor in which a tape being constituted by mesh members and fruit flights advances longitudinally in a frame up to a cutting station in which a vertical cutting plane orthogonal to the advancing tape is provided, the fruit flights being shaped with a number of recesses in which fruits are positioned with fruit suture plane thereof, containing a suture line, being arranged vertically, in which the machine further comprises:

a fruit recognizing station for detecting the suture line of each fruit, suitable to detect the position of the vertical suture plane, and calculating an a dihedral angle formed between the vertical suture plane and the vertical cutting plane, and communicating either information on the calculated dihedral angle or information of non detection; and an orientation station, being connected to a removing station, comprising a programmable logic controller (PLC), a row of gripping units, wherein said PLC is adapted to receive information on the dihedral angle formed between the vertical suture plane and the vertical cutting plane of a given fruit, and to control a respective gripping unit of the row of gripping units, each gripping unit individually comprising a motor bearing on its shaft a gripper adapted to grip and rotate a fruit in its recess from its initial position, in which the vertical suture plane of the fruit intersects said vertical cutting plane, to a final position in which the vertical suture plane of the fruit is parallel to said vertical cutting plane, the PLC also being adapted to receive information of non detection of the dihedral angle formed between the vertical suture plane and the vertical cutting plane for a given fruit and to control said removing station for the removal of the fruit from the fruit lane.

Thanks to the machine according to the present invention it is really possible to allow the cutting station of a pitting machine to cut in a perfect way the totality of the fruits which are received.

In fact, the fruits that may result in an inaccurate cut are removed from the fruit lane; the others, which have an evident suture line disposed in a vertical plane thanks to a previous rotation device of the fruits, are individually analyzed in order to display the location of the vertical suture plane with respect to a plane orthogonal to the fruit multiple lanes and to calculate the dihedral angle, i.e. the spatial angle formed by the vertical suture plane with respect to the vertical cutting plane of a subsequent cutting station in the machine. The knowledge of the dihedral angle is used by the orientation station in which each fruit is grasped and rotated by a clamp by said dihedral angle in a manner that its vertical suture plane is positioned parallel to the vertical cutting plane.

Advantageously, the fruit recognizing station uses a camera for each fruit lane. Suitably, the cameras are fixed on supports such as tripods whose feet rest on the floor, preferably at the sides of the machine frame for automatic pitting, so as to take, from the bottom of the fruit lane, through the openings of the recesses, the suture line of each fruit. The supports of the cameras are not fixed on the machine frame both not to interfere with the fruit lane in its return section, and not to suffer the vibrations of the machine frame that worsen the take of the cameras. The cameras are positioned within housings, provided with a transparent screen in order to protect the cameras from dirt; advantageously, the transparent screen is tilted to allow a better cleaning.

With regard to the orientation station, it is located astride the frame so that the fruits are gripped from above with respect to the fruit bearing tape that proceeds longitudinally by means of a device movable vertically up and down synchronously with the knives of the cutting station.

In general, the invention also relates to a method of recognizing and orienting fruits, especially peaches, for their automatic pitting in order to have the suture plane containing the suture line of the fruit, in parallel to a vertical cutting plane orthogonal to the fruit lane, after each fruit has been rotated in a previous step of tilting in a manner that the suture plane of the fruit is arranged vertically, in which the method includes for each fruit:

a step of suture line detection, in which the correct detection of the position of the vertical suture plane of the fruit occurs with respect to said cutting vertical plane or non detection thereof;

in case of a correct detection of the suture line, the calculation of the dihedral angle formed between the vertical suture plane and said vertical cutting plane and the communication of this dihedral angle to be used later;

in case of non detection of the fruit suture line, the communication of an information of non detection to be used later;

as a result of the dihedral angle communication, a step of adjustment of the fruit position, in which gripping means uses such communication to grip the fruit from the fruit lane, to rotate it by this dihedral angle and to release it in the position in which its vertical suture plane coincides with said cutting vertical plane;

following the communication of non detection information, a step of removing the fruit including the lifting of the fruit and its removal from the fruit lane.

BRIEF DESCRIPTION OF DRAWINGS

Further features and advantages of the present invention will become more apparent from the indicative, and therefore non-limiting description of a preferred but not exclusive embodiment of a machine suitable for recognizing and orienting fruits, especially peaches, for their automatic pitting, as illustrated in the accompanying drawings in which:

FIG. 4 is a side view of a fruit flight full of fruits;

FIG. 5 is a bottom view of the fruit flight in FIG. 4;

FIG. 6 is a cross-section view made along line B-B in FIG. 4; and

FIG. 7 is an enlarged view of a detail in FIG. 5, in which the angle between suture plane and cutting plane as taken by a camera is shown.

DESCRIPTION OF A PREFERRED EMBODIMENT OF THE INVENTION

Figure 1:
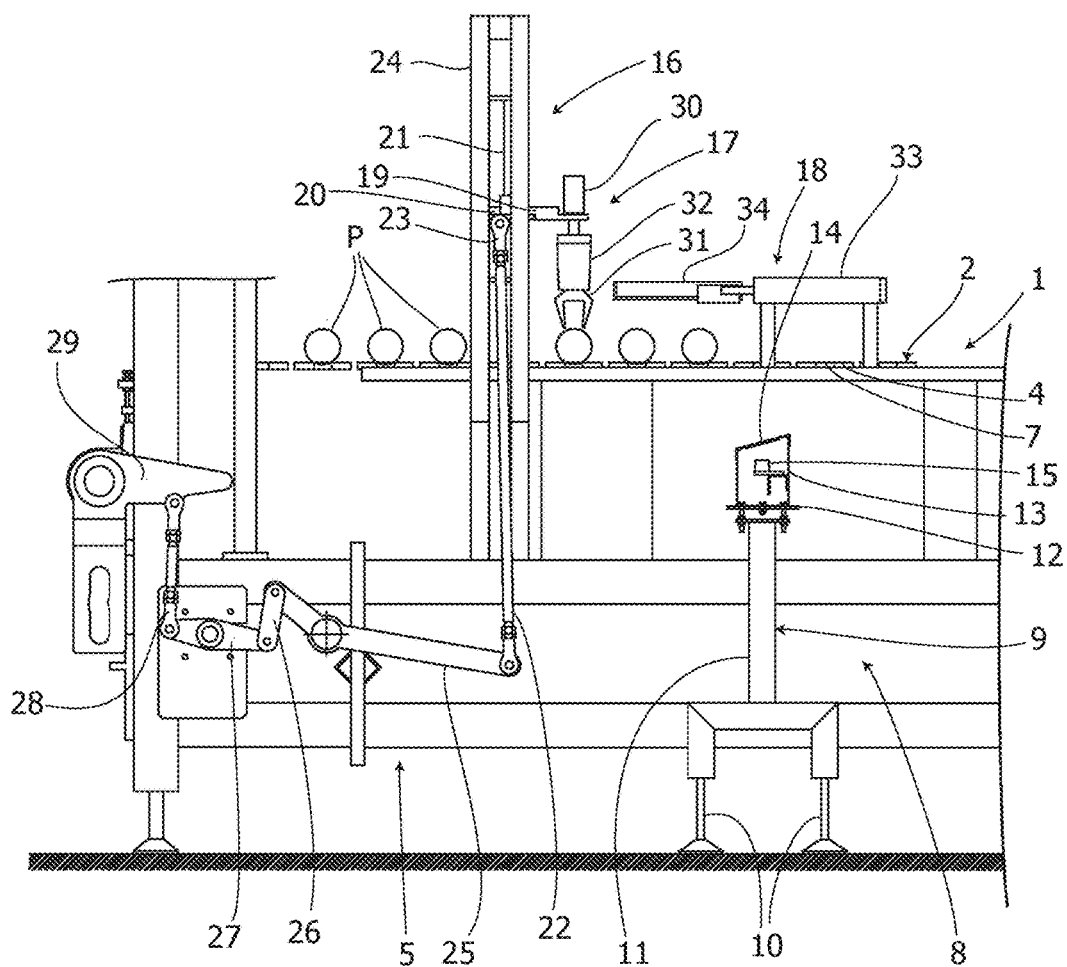
FIG. 1 is a partial and cut schematic side view of a machine for recognizing and orienting fruits, especially peaches, for their automatic pitting.
Figure 2:
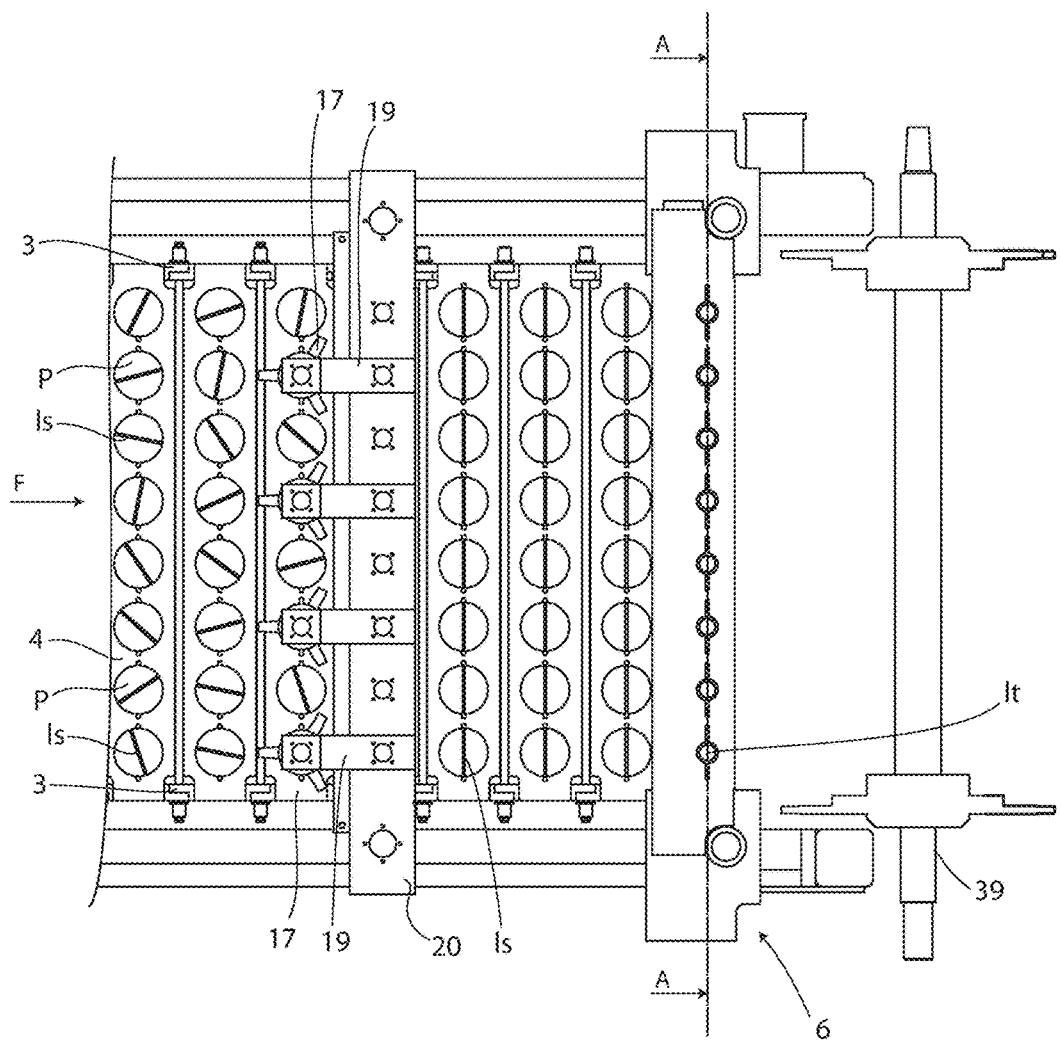
FIG. 2 is a partial schematic top plan view of the machine in FIG. 1.

With reference to FIG. 1, the machine suitable for recognizing and orienting fruits, especially peaches, for their automatic pitting according to the present invention comprises a fruit flight conveyor 1. The fruit flight conveyor 1, substantially conventional, has a tape 2 constituted by mesh elements 3 and fruit flights 1, better shown in FIG. 2, which is a partial schematic top plan view of the machine in FIG. 1. The tape 2, which advances in a frame 5, has a plurality of fruit lanes, eight in number in the embodiment of the present invention, up to a cutting station 6 shown schematically in FIG. 2. The cutting station 6 has conventionally a vertical cutting plane, indicated by the cross-section line A-A in FIG. 2 according to which a cut is made orthogonal to the fruit lane. The fruit flights are shaped with a number of recesses 7, as shown in FIGS. 4 and 6, which are a side view of a fruit flight full of fruits, and a cross-section view made along line B-B in FIG. 4, respectively. Fruits P are positioned with their suture plane, containing the suture line, arranged vertically. Generally indicated as 8, in FIG. 1, is a fruit recognizing station for recognizing the suture line of each fruit P. The fruit recognizing station 8 is adapted to detect the position of the vertical suture plane, to calculate the dihedral angle formed by the vertical suture plane with respect to said cutting vertical plane and to communicate information about the calculated dihedral angle or about the non detection information.

The fruit recognizing station 8 comprises a supporting element 9, preferably placed on the ground, and arranged transversely to the frame 5 of the machine astride the return stroke of the tape 2. The support element 9 can have, at both its two lateral ends, a substantially inverted Y shape, with adjustable feet, generally indicated as 10, and the upright 11. At the top of the upright 11 is a support plate 12 of a housing 13 covered by a transparent plate 14. Inside the chamber 13 is a camera 15 for each fruit lane.

The fruit recognizing station 8 is at the service of an orientation station 16, downstream of the fruit recognizing station 8 in the fruit lane. The orientation station 16 comprises a programmable logic controller (PLC), not shown, a row of staggered or zigzag gripping units 17, one for each fruit lane, and a removal station 18 for the removal of the fruits in that fruit lane. By way of example, the orientation station 16 has eight brushless motors, one on each lane of the machine, that are mounted staggered to avoid interference. In FIG. 1, for simplicity sake, only one gripping unit 17 is shown, and four in FIG. 2, while the other four, staggered as mentioned above, are not visible.

The gripping units 17 are linked by means of respective brackets 19 to a plate 20 movable on vertical guides 21. The plate 20 is connected to a long rod 22 through an arm 23 pivoted in the long rod 22. The arm 23 is constrained to move within a casing 24 carrying the vertical guides 21. The long rod 22 is linked to a first lever 25 pivoted on the frame 5, connected, in turn, by a handle 26, a second lever 27, and a short rod 28 to a lever 29 actuated by the same motor that determines the advancement of the tape 2. It should be apparent that the vertical movement of the orientation station 16 can be achieved by other means, such as jacks, electric or hydraulic or pneumatic cylinders.

Each gripping unit 17, which is supported by a bracket 19 to the plate 20, comprises a brushless motor 30, connected to a gripper 31 for gripping the fruits P controlled by a device 32. The gripping unit 17 may be the one produced by Festo AG & Co. KG and called FinGripper, that can manipulate the fruits gently and reliably. All the gripping units 17 of the various fruit lanes are vertically movable together with the plate 20. Disposed by the side of the gripping units 17 is the removal station 18 for the removal of the fruits not suitable to be cut. The removal station 18 comprises a structure 33 bearing by hydraulic pistons a tray 34 adapted to position itself under the gripping units 17 to receive the fruit to be removed from the grippers 31. Alternatively, a horizontal pusher arranged horizontally on the same frame 24 of the orientation station can be provided as a device for fruit removal. In this case, each horizontal pusher, for example in the form of a hydraulic cylinder carries, at its free end, a vertical palette shaped element adapted to push a fruit P, not suitable to be cut, in a waste channel.

The PLC is adapted to receive information on the dihedral angle formed by the vertical suture plane with respect to the vertical cutting plane of a given fruit, as shown in detail hereinafter, and to control a respective gripping unit of the row of gripping units 17. The gripper 31 of each gripping unit 17 is adapted to grip and rotate a fruit P in its recess 7 from its initial position, in which the vertical suture plane of the fruit intersects the vertical cutting plane, to a final position in which the vertical suture plane of the fruit is parallel to the vertical cutting plane. This is shown in detail in FIGS. 5 and 7, which are a bottom view of the fruit plate in FIG. 4 and an enlarged view of a detail in FIG. 4, respectively. Shown in FIG. 4 is the angle α between the suture plane and the cutting plane of a fruit P as taken by the camera 15, corresponding to the angle between the suture line ls and the cutting line lt.

Explained in more detail in the following is the recognition of the suture plane of the fruits in order to allow the optimal cut thanks to the cameras 15, eight in number, namely one for each lane, which cooperate with a microprocessor device and a software for processing the obtained images. The eight cameras 15 acquire a continuous video stream of images of the fruits. This video stream transmitted to the microprocessor device is processed by the image processing software which performs primarily the functions of:

capturing a video stream from the cameras during the stop of the fruits;

determining the vertical plane containing the suture line of the fruit and determining the angle formed between the suture line and the cutting line defined by the vertical cutting plane at the cutting station, the angle being in the space a dihedral angle; and transmitting the calculated angle to the orientation station, which is connected to the removal station, in order to obtain the rotation of the fruit, or its removal from the fruit lane.

The technique used for the determination of the suture line is that one of the edge detection, which is normally used in the image processing for the recognition of the contours on the basis of the marking of points of a digital image in which the light intensity changes abruptly.

This technique is employed here to recognize the suture line of the fruit, which can be approximated to a straight line, in order to calculate the necessary angle of rotation.

The image processing software is connected to the PLC and waits for the pulse that indicates the beginning of the dwell of the fruit flight 4, under the cameras 15. The dwell period, which corresponds to the cutting period, is of about 1.5 s.

Upon receipt of the pulse the software starts the acquisition by the cameras of the video stream, from which twenty-five frames are extracted in 0.83 s. The twenty-five frames are snapshots of the fruit in the same position and are useful for a statistical comparison of the performed processing.

Applied on each of the frames is an algorithm for edge detection in order to determine the contour of the suture line. This contour consists of a cloud of points. The software tracks, then, straight lines interpolating all pairs of points of the identified contour, i.e. for each pair of points, $(x_a, y_a)$ and $(x_b, y_b)$, the interpolating function is determined:

$$f(x) = \frac{x - x_b}{x_a - x_b} y_a - \frac{x - x_a}{x_a - x_b} y_b$$

Among all the straight lines which are obtained, the one that intercepts the greatest number of points is selected, being the most likely candidate to coincide with the suture line of the fruit. The angle formed by the suture line with the cutting line, which is the trace of the vertical cutting plane perpendicular to the lines of advancement of the fruit is calculated.

Therefore for each of the twenty-five frames a value of inclination of a straight line probably corresponding to the suture line is obtained. Among the calculated twenty-five angles the one that occurs more frequently is assumed. If this angle, with a tolerance less than 16 degrees, prevails over the others significantly, it is selected as the winning angle and transmitted to the orientation station 16. The plate 20, bearing all the gripping units 17, is lowered towards the fruits. The gripping unit 17 corresponding to the fruit in question, as soon as this arrives at the height of the gripping unit 17, opens the grippers 31, grips the fruit and rotates it at the angle reported by the fruit recognizing station 8. Then the gripping unit 17 releases the fruit in the same recess where it was but rotated to the position corresponding to the cut.

If in the fruit recognizing station no winning angle emerges, a code that is equivalent to an algorithm indecision is transmitted to the orientation station 16. The plate 20, bearing all the gripping units 17, is lowered towards the fruits. The gripping unit 17 corresponding to the fruit in question, as soon as this arrives at the height of the gripping unit 17, opens the grippers 31, grips the fruit and retains it without causing it to rotate. Then the removal station 18 positions the tray 34 to receive the fruit to be removed and removes it from the fruit lane. Therefore the fruit in question is discarded. The cycle is repeated for the next row of fruits.

Briefly, the possibilities for the fruits are basically those that follow.

In the case that the fruit recognizing station 8 recognizes, from the individual reading of twenty-five frames, a suture line as a straight line, for example consisting of a predetermined minimum number of points, and the angle formed by this with a cutting line that is perpendicular to the fruit lane, it is verified that the fruit in question can be pitted and therefore the fruit is rotated in the orientation station 16 at this angle recognized in the fruit recognizing station. The suture line and the cutting line may form part of a bundle of straight lines included in a predetermined tolerance angle. This angle is around 15 degrees.

In the case that the fruit recognizing station 8 does not recognize a predetermined minimum number of points to locate a suture line, in the orientation station 16 the fruit is removed from the fruit lane. The lack of recognition may result from incorrect reversal of the fruit by the machine upstream of the fruit recognizing station, from physical defects of the fruit, such as spots and deformations, or a not visible suture line, as in the case of an unripe peach or other. The fruit in question is removed from the machine and put to another use.

Figure 3:
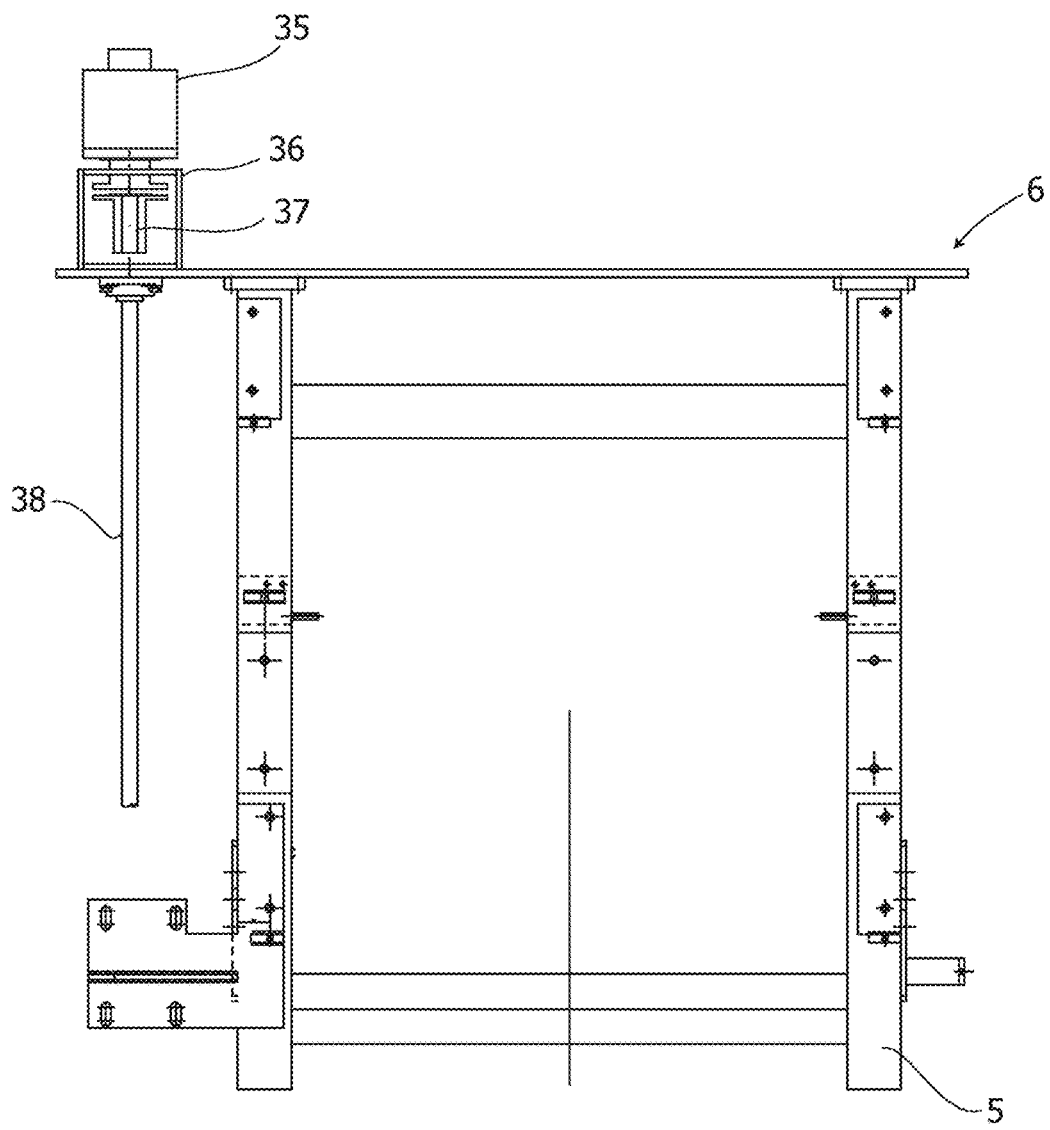
FIG. 3 is a partial schematic cross-section view made along line A-A in FIG. 2.

The machine according to the present invention further comprises the cutting station 6, shown in partial cross-section view in FIG. 3. In general, the cutting station is known and is not described in its operation. The drive of the knives in the cutting station is normally carried out through mechanical connections with the tape feeding motor. However, according to the invention, the drive of the knives (not shown), thanks to a not shown encoder which verifies the advancement of the tape and communicates it to the PLC, can be achieved by a brushless motor 35 mounted on a supporting member 36 and connected by a coupling 37 to a splined shaft 38 which operates the knives in a known manner.

It should be understood that the foregoing description is only an embodiment of the machine for recognizing and orienting fruits, especially peaches, for their automatic pitting, according to the invention. It has a scope defined by the appended claims.

The invention claimed is:

1. A machine for automatically pitting fruits, especially peaches, comprising:
   a fruit flight conveyor (1) having a fruit multiple lane tape (2) that is constituted by mesh members (3) and fruit flights (4) and advances longitudinally in a frame (5), and
   a cutting station (6) in which a vertical cutting plane orthogonal to the advancing tape (2) is provided,
   the fruit flights (4) being shaped with a number of recesses (7) in which fruits (P) are positioned with fruit suture plane thereof, containing a suture line (ls), being arranged vertically,
   wherein the machine further comprises:
   a fruit recognizing station (8) suitable to detect the position of the vertical suture plane, to calculate an angle (α) between the suture line (ls) and a cutting line (lt) corresponding to a dihedral angle formed between the vertical suture plane and the vertical cutting plane, and to communicate either information on the calculated dihedral angle or information of non detection;
   an orientation station (16), comprising a programmable logic controller (PLC), a row of gripping units (17), wherein said PLC is adapted to receive information on the dihedral angle formed between the vertical suture plane and the vertical cutting plane of the given fruit (P), and to control a respective gripping unit (17) of the row of gripping units (17), each gripping unit (17) comprising a motor (30) bearing on its shaft a gripper (31) adapted to grip and rotate the fruit (P) in a recess from an initial position, in which the vertical suture plane of the fruit (P) intersects the vertical cutting plane, to a final position in which the vertical suture plane of the fruit (P) is parallel to the vertical cutting plane, said PLC also being adapted to receive information of non detection of the dihedral angle formed between the vertical suture plane and the vertical cutting plane for the given fruit (P); and
   a removing station (18) controlled by said PLC, for removal of the fruit from the fruit lane.

2. The machine according to claim 1, wherein the fruit recognizing station (8) comprises a support element (9) arranged transversely to the frame (5) of the machine astride the tape (2) and carrying a camera (15) for each fruit lane, each camera (15) cooperating with a microprocessor device and a software for the detection of the suture line of each fruit.

3. The machine according to claim 2, wherein each camera (15) is positioned under the tape (2) advancing toward the cutting station (6).

4. The machine according to claim 1, wherein the gripping units (17) are arranged staggered or zigzag on the fruit multiple lanes.

5. The machine according to claim 1, wherein the gripping units (17) are mounted by brackets (19) to a plate (20) movable on vertical guides (21), the plate (20) being driven by a same motor that drives the advancing tape (2).

6. The machine according to claim 1, wherein the removing station (18) for the removal of fruits not suitable to be cut comprises a structure (33) supporting by hydraulic pistons a tray (34) adapted to be positioned under the gripper units (17) to receive said fruits from their grippers (31).

7. The machine according to claim 1, wherein the cutting station, located downstream of the orientation station, comprises a knife driving motor (35) that is controlled by the PLC via an encoder that measures and communicates the advancement of the tape (2).

8. A method of recognizing and orienting fruits, especially peaches, for their automatic pitting in order to position a suture plane containing a suture line (ls) of the fruit (P), parallel to a vertical cutting plane perpendicular to a fruit lane, after each fruit (P) has been rotated in a previous step of tilting in a manner that the suture plane of the fruit is arranged vertically, wherein the method comprises for each fruit (P):
   a step of detection of the suture line (ls), in which a correct detection of a position of the vertical suture plane of the fruit (P) takes place or not with respect to said vertical cutting plane,
   in case of correct detection of the suture line (ls), a calculation step for calculating a dihedral angle formed between the vertical suture plane and the vertical cutting plane and communication of this dihedral angle to be used later;

in case of non detection of the suture line (ls) of the fruit, the communication of non detection information to be used later;

following the communication of the dihedral angle, a step of adjustment of the position of the fruit (P), in which gripping means uses such communication to grip the fruit (P) from the fruit lane, rotate it by such a dihedral angle and release it in a position in which its vertical suture plane coincides with said vertical cutting plane; and following the communication of non detection information, a fruit removing step including lifting the fruit (P) and removing it from the fruit lane.

\* \* \* \* \*